United States Patent [19]

Donnelly

[11] 4,300,792
[45] Nov. 17, 1981

[54] PIPE ASSEMBLY

[76] Inventor: Frank Donnelly, 18 Burton La., Rockaway, N.J. 07866

[21] Appl. No.: 176,767

[22] Filed: Aug. 11, 1980

[51] Int. Cl.³ ............................................. F16L 17/04
[52] U.S. Cl. ..................................... 285/112; 285/373
[58] Field of Search ........................ 285/112, 373, 419

[56] References Cited
U.S. PATENT DOCUMENTS

| 2,725,246 | 11/1955 | Weinhold | 285/373 X |
| 2,766,518 | 10/1956 | Costanzo | 285/112 X |
| 2,821,415 | 1/1958 | Race, Jr. | 285/112 |
| 3,054,629 | 9/1962 | Piatek | 285/373 |
| 3,082,022 | 3/1963 | Moore | 285/112 |
| 3,135,534 | 6/1964 | Basham | 285/112 |
| 3,695,638 | 10/1972 | Blakeley | 285/112 |

FOREIGN PATENT DOCUMENTS 858368 1/1961 United Kingdom ................ 285/112

Primary Examiner—Thomas F. Callaghan
Attorney, Agent, or Firm—Marvin A. Naigur

[57] ABSTRACT

A pipe assembly in which a plurality of abutting pipe sections are connected together by a clamp assembly. Each pipe section has a pair of diametrically opposed slots in its outer surface which are spaced a predetermined distance from its end. A support sleeve is inserted within the end portions of each pipe section and has a circumferential groove formed therein in axial alignment with the slots. The clamp assembly extends over the corresponding end portions of the adjacent pipe sections and includes two shoulder portions spaced apart a distance corresponding to the distance between the respective slots of adjacent pipe sections so that portions of each shoulder extend in a corresponding pair of slots.

8 Claims, 5 Drawing Figures

U.S. Patent  Nov. 17, 1981  4,300,792
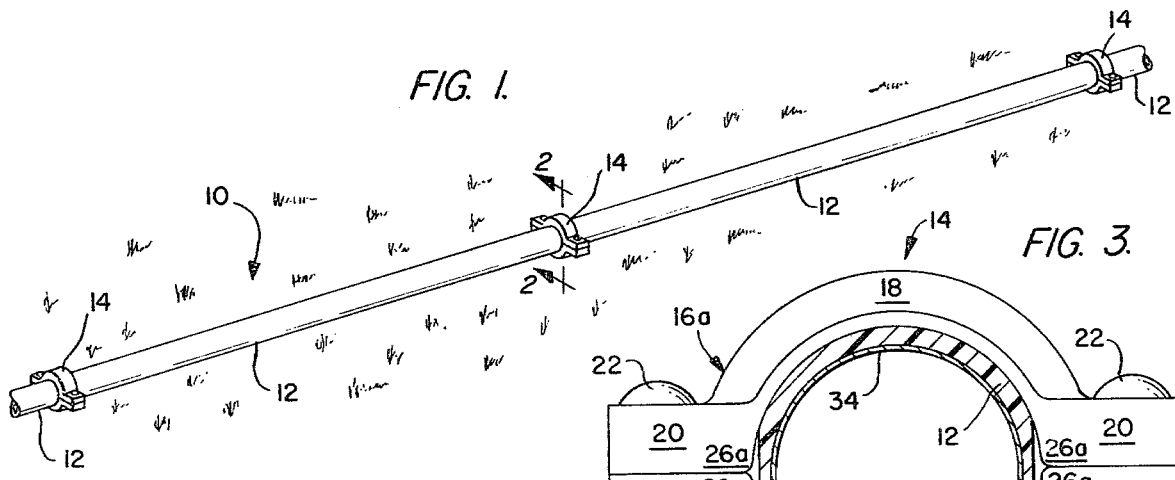
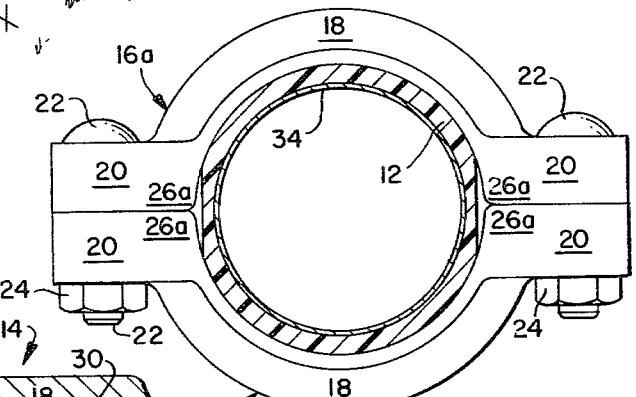
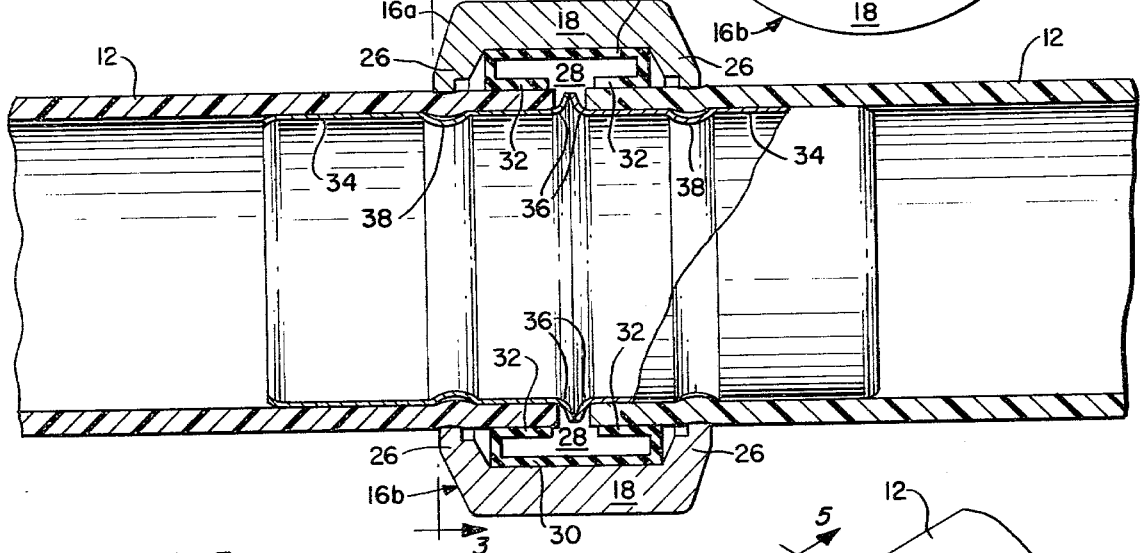
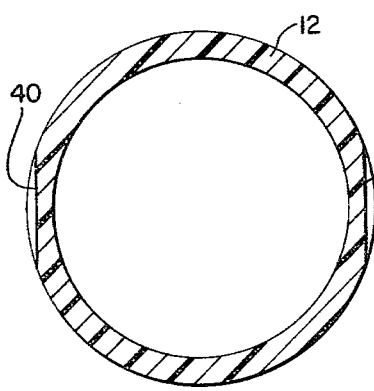
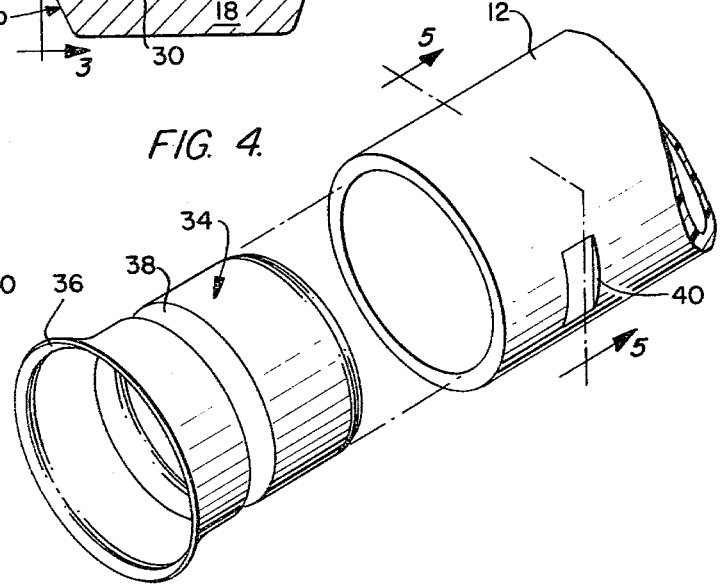

PIPE ASSEMBLY

BACKGROUND OF THE INVENTION

This invention relates to a pipe assembly and more particularly to a pipe assembly including a clamping assembly associated with each abutting pair of pipe sections for clamping the sections together.

Plastic pipes have grown increasingly popular in recent years due to their light weight, low cost and relatively high resistance to chemicals and other corroding fluids. In the use of plastic pipes, as in the use of other types of pipes, including metal pipes, the pipe is fabricated in sections of various lengths and usually conveyed to the installation site where the pipe sections are connected to form the final assembly. In permanent installations, the usual technique for joining the plastic pipe sections is to fuse the pipe ends together with a fusion machine. However, this machine necessitates a power source and is so bulky that its use is prohibitive in close quarters. Because of these shortcomings, systems have been developed for the quick coupling of adjacent sections of plastic pipes. However, most of the quick coupling techniques involve the use of a circumferential groove formed at the ends of the pipe sections so that they can hold a gasket and/or corresponding keys formed on clamping assemblies. However, the formation of these grooves reduces the strength of each pipe section. The above problem is particularly acute in connection with pipe assemblies which are installed only temporarily and are subject to disassembly and removal from one place to another, since the multiple assembly and disassembly operations further weaken the pipe sections formed with the circumferential grooves.

SUMMARY OF THE INVENTION

It is therefore an object of the present invention to provide a pipe assembly in which adjoining pipe sections can be easily clamped together.

It is a further object of the present invention to provide a pipe assembly of the above type in which the use of a circumferential groove formed in the outer surface of each pipe section is eliminated.

It is a still further object of the present invention to provide a pipe assembly of the above type which can be easily and quickly assembled and disassembled without compromising the strength of the pipe sections.

Toward the fulfillment of these and other objects, the pipe assembly of the present invention comprises a plurality of abutting pipe sections each having a pair of diametrically opposed slots formed in its outer surface and spaced a predetermined distance from its end. A support sleeve is inserted within the end portions of each pipe section and has a circumferential groove formed therein in axial alignment with the slots. A clamp assembly extends over the corresponding end portions of adjacent pipe sections, and includes a cylindrical base portion and two shoulder portions extending radially inwardly from the base portion and spaced apart a distance so that portions of each shoulder can extend in a corresponding pair of slots. A radially inwardly directed force is applied to the shoulder portions to clamp the pipe sections together.

BRIEF DESCRIPTION OF THE DRAWINGS

The above description, as well as the objects, features, and advantages of the present invention will be more fully appreciated by reference of the following detailed description of a presently preferred but nonetheless illustrative embodiment in accordance with the present invention, when taken in conjunction with the accompanying figures in which:

FIG. 1 is a perspective view of a pipe assembly according to the present invention;

FIG. 2 is a cross-sectional view taken along the line 3—3 of FIG. 4;

FIG. 3 is a cross-sectional view taken along the line 3—3 of FIG. 2;

FIG. 4 is a partial enlarged perspective view depicting a potion of the pipe assembly of FIG. 1; and FIG. 5 is an enlarged cross-sectional view of a pipe section of the assembly of FIG. 1.

DESCRIPTION OF THE PREFERRED EMBODIMENT

Referring to FIG. 1 of the drawings, the reference numeral 10 refers in general to the pipe assembly of the present invention which is formed by a plurality of adjoining plastic pipe sections four of which are shown by the reference numeral 12. The corresponding end portions of the adjoining end sections 12 are clamped together by a metal clamping assembly shown in general by the reference numeral 14 and described in more detail in connection with FIGS. 2 and 3.

In particular, each clamping assembly is formed by two juxtapositioned hemicylindrical segments 16a and 16b. Each segment 16a and 16b is formed by a cylindrical base portion 18 having diametrically opposed bolt pads 20 extending outwardly therefrom. A pair of bolts 22 extend through aligned openings formed in the corresponding bolt pads 20 and receive nuts 24 for drawing the segments 16a and 16b together and thus applying an inwardly directed force about the pipe ends being joined as will be described in detail later.

As shown in FIG. 2, a pair of shoulders 26 extend from the sides of each base portion 18 thereby defining an annular cavity 28 which receives a pressure responsive resilient gasket 30. The gasket 30 has peripheral inturned lips 32 which engage portions of the outer surfaces of the adjoining pipe sections 12.

As better shown in FIGS. 2 and 4, each pipe section 12 has an insert sleeve 34 of a metallic material which extends within the pipe section 12, with the end of each sleeve being upturned to form a lip 36 which extends slightly outwardly from the corresponding end of the pipe section. A circumferential groove 38 is formed in each insert sleeve 34, with the distance between the end of the sleeve and the groove being such that the ends of the shoulders 26 of each segment 16a and 16b of the clamping assembly 14 are in axial alignment with the grooves.

As shown in FIG. 5, a pair of chord-like slots 40 are provided in diametrically opposed sections of each pipe section and extend for an angular distance less than 45° and preferably approximately 38°. As better shown in FIG. 4, the slots 40 are spaced a distance from the ends of the corresponding pipe sections 12 so that they are in axial alignment with the circumferential grooves 38 of the corresponding insert sleeves 34 and therefore the shoulders 26 of the segments 16a and 16b.

Since the clamping assembly 16 is designed so that the diameter defined by the inner surfaces of the hemicylindrical segments 16a and 16b is slightly less than the outer diameter of the pipe sections 12, the slots 40 accommodate the leading edges 26a of the segments 16a and 16b and thus enable the clamping assembly to be accurately positioned prior to the application of the radially inwardly directed force resulting from the tightening of the nuts 24 over the bolts 22. Of course, the application of this force causes the clamping assembly to slightly "bite" into the outer surface of the pipe section to provide a secure connection.

It is thus seen that the pipe assembly of the present invention provides a simple and effective system in which the adjoining pipes sections 12 can easily be coupled and uncoupled without compromising the structural integrity of the pipe sections yet providing a rigid and leak-proof connection.

As will be apparent to those skilled in the art, various changes and modifications may be made to the apparatus of the present invention without departing from the spirit and scope of the present invention as recited in the appended claims and their legal equivalent.

What is claimed is:

1. A pipe assembly comprising a plurality of confronting pipe sections fabricated from resilient plastic material each having a pair of diametrically opposed cord-like slots each formed in its outer surface with a planar land section and spaced a predetermined distance from its end; a support sleeve inserting within the end portions of each pipe section and having a circumferential groove formed therein in axial alignment with said slots; and a clamp assembly extending over the corresponding end portions of adjacent pipe sections, said clamp assembly including a cylindrical base portion, two shoulder portions extending radially inwardly from said base portion and spaced apart a distance corresponding to the distance between the respective slots of said adjacent pipe sections so that a portion of each shoulder extends in said planar land sections of a corresponding pair of said slots, and means capable of applying a radially inwardly directed force to said shoulder portions to deform said plastic material to conform with said groove such that while said clamping force is maintained said plastic material is forced into said groove and said pipe sections are clamped together.

2. The pipe assembly of claim 1 further comprising a gasket extending within each clamping assembly and over the outer surfaces of each pair of corresponding confronting pipe sections.

3. The pipe assembly of claim 1 wherein said clamping assembly comprises two hemicylindrical base portions.

4. The pipe assembly of claim 3 wherein said clamping assembly further comprises a pair of mounting flanges extending outwardly from each hemicylindrical base portion and bolt means extending through said flanges and adapted to be secured by threaded means to apply said radially inwardly directed force.

5. The pipe assembly of claim 4 wherein the inner diameter defined by said shoulder portions is slightly less than the outer diameter of each pipe section.

6. The pipe assembly of claim 3 wherein the leading edges of said shoulder portions extend in said slots during assembly of said clamping assembly over its corresponding confronting pipe sections and before application of said radially inwardly directed force.

7. The pipe assembly of claim 1 wherein the arcuate length of each slot is less than forty five degrees.

8. The pipe assembly of claim 1 wherein said support sleeves and clamping assembly are of metal.

* * * * *